United States Patent [19]

Gömöry et al.

[11] Patent Number: 4,541,488
[45] Date of Patent: Sep. 17, 1985

[54] PROCESS FOR INCREASING THE WATER DISCHARGE OF WATER DELIVERING DRILLED WELLS, PREVIOUSLY USED FOR WATER DELIVERY, AND HAVING DECREASED WATER DISCHARGE

[75] Inventors: Pál Gömöry; János Hegedüs; Ferenc Kiss; Attila Simon, all of Budapest, Hungary

[73] Assignee: Generalimpex, Budapest, Hungary

[21] Appl. No.: 552,135

[22] PCT Filed: Dec. 26, 1981

[86] PCT No.: PCT/HU81/00049

§ 371 Date: Oct. 14, 1983

§ 102(e) Date: Oct. 14, 1983

[87] PCT Pub. No.: WO83/02296

PCT Pub. Date: Jul. 7, 1983

[51] Int. Cl.⁴ .................... E21B 21/00; E21B 43/27
[52] U.S. Cl. ................................. 166/307; 166/312
[58] Field of Search ............... 166/271, 300, 307, 312

[56] References Cited

U.S. PATENT DOCUMENTS

| | | |
|---|---|---|
| 1,984,668 | 12/1934 | Weir et al. ................ 166/312 X |
| 2,045,899 | 6/1936 | Davis ....................... 166/307 UX |
| 2,852,077 | 9/1958 | Cocks ....................... 166/271 X |
| 2,933,137 | 4/1960 | D'Audiffret et al. ........... 166/312 |
| 2,978,026 | 4/1961 | Bemis ........................... 166/312 |
| 3,122,503 | 2/1964 | Katzer ....................... 166/312 X |
| 3,482,636 | 12/1969 | Crowe ........................ 166/312 X |

*Primary Examiner*—George A. Suchfield
*Attorney, Agent, or Firm*—Karl F. Ross; Herbert Dubno

[57] ABSTRACT

Process for increasing the water discharge of water delivering drilled wells, which can be characterized in that into the filter section of the well weak acids with a dissociation constant being less than $K_d = 10^{-3}$ are introduced. After a dwelling period of longer duration, expediently 10 to 48 hours, as well as compressing, flushing is performed by means of a scavenging pump. Thereafter the solution of sodium bicarbonate and/or sodium hypochlorite is introduced into the filter section. After a longer dwelling period, expediently one to thirty-six hours, flushing is performed by means of the scavenging pump. As weak acids with a dissociation constant being less than $K_d = 10^{-3}$ acetic acid, tartaric acid, citric acid, metaboric and/or tetraboric acid is used.

5 Claims, No Drawings

PROCESS FOR INCREASING THE WATER DISCHARGE OF WATER DELIVERING DRILLED WELLS, PREVIOUSLY USED FOR WATER DELIVERY, AND HAVING DECREASED WATER DISCHARGE

This application is a national phase application of PCT Application PCT/HU81/00049 filed Dec. 23, 1981.

TECHNICAL FIELD

The invention relates to a process for increasing the water discharge of water delivering drilled wells in the case of the decrease of the water discharge with wells having been exploited for a longer period, for restoring i.e. increasing the water permeability of the original rocks by reducing the well-resistance, by using a chemical treatment.

BACKGROUND ART

As it is a well known fact, the water discharge of the water delivering drilled wells depends in addition to the layer conditions on the mode of the well formation, the age of the well, the methods of water production and on the quality of water.

The mode of well formation includes the structural solutions to be applied. e.g. the piping, the arrangement and construction of the filter, as well as the drilling methods and pumping with the purpose of cleaning being utmost important from the point of view of water discharge. The pumping serving for purification may decisively influence the quality of well formation, which can be characterized numerically by the well-resistance. As it is known, the components of well-resistance are the following: the dam effect, i.e. the changed resistance of the zone around the well, the layer resistance, the filter resistance, the resistance resulting from the enstrustation, the resistance-surplus of a more or less turbulent stream—compared to the linear stream—at higher flow velocities and at least the flow resistance of the piping in the well.

By the application of the process according to the invention the increase of the water discharge can be achieved by a considerable decrease of the dam effect—the more, by converting it into an effect with a different sign (achieving a lower resistance in the zone around the well, than the original one), by the reduction of the resistance resulting from encrustation and indirectly by the reduction of the resistance-surplus of the turbulent stream.

It is a fact of common knowledge, that the resistance of the zone around the filter can be reduced by pumping, for this purpose the so-called Mammoth pump or a compressor is used. The pumping method in itself rarely yields satisfactory results. In the majority of cases the reason for the insufficient effect of pumping is, that the pressure drop in the well does not entirely break up the conglomerated layer in the clogged zone around the filter, but only in certain places. The water streaming along the lowest resistance in the initially small channels having been formed in such a manner—forms more and more larger ducts resulting finally in the collapse of the layer. In this case the whole cleaning process has to be repeated.

Encrustation, i.e. clogging is caused by the deposition of different compounds; said compounds contain mainly iron and calcium in the form of carbonates, oxides, hydroxides, sulfates and silicates. Due to biological effects, e.g. as a consequence of the activity of iron- and manganese bacteria organic compounds may also deposit. The rate of encrustation increases in proportion to the age of the well, at the same time the mode of operation and the quality of water are also considerably influence the rate of incrustation. The so-called "ochre-formation" is the largest problem, accordingly, it is to be considered as the most dangerous phenomenon; the course of this process iron compounds, mainly ferric(lll-)hydroxide are segregated. According to our experiences, the intensity of draw-off plays an inportant role in ochre-formation. The partial or total turbulence arising with higher flow velocities considerably increases the rate of ochre-formation, while with wells which are out of operation ochre-formation usually could not be observed.

In order to be able to eliminate the layer purification by means of pumping, mostly a treatment with hydrochloric acid has been used (E. Bieske: Handbuch des Brunnenbaus, Berlin, 1965). Hydrochloric acid dissolves the oxides and carbonates and elution of the ferrous and calciferous deposits in the form of chlorides from the filter zone becomes possible. However, treatment with hydrochloric acid may be disadvantageous in several cases, e.g. where the relatively rapid and strong dissolving effect may result in the collapse of layers, in addition to this, due to its metal dissolving effect, hydrochloric acid is highly damaging to all of the fittings made of steel. In spite of the known damaging effects, improvement of wells with a reduced water discharge is mostly performed by using hydrochloric acid (Technical Directives of the Office of Water Conservancy, 136/4-73/4.2). The layer purification with hydrochloric acid causes corrosional damage in the metal parts and in the case of glassfibre-reinforced synthetic casing pipes the risk is extraordinarily high and may lead to the early aging of the well.

DISCLOSURE OF INVENTION

In the course of our examinations to eliminate the disadvantageous features of the known processes which serve to increase the water discharge of drilled wells, we have found, that the water discharge of the drilled wells can be increased with a surprisingly good result—with a yield usually surpassing the original one—by introducing weak acids into the filtering section, the dissociation constant of which is less, than $K_d = 10^{-3}$ and after a longer dwelling period, expediently 10 to 48 hours and compression, flushing by means of a scavenging pump is performed. Thereafter, the solution of sodium bicarbonate and/or sodium hypochlorite is introduced into the filtering section. After a longer dwelling period, expediently lasting 1 to 36 hours, repeated flushing is performed by means of the scavenging pump.

The weak acids to be used in the course of the process according to the invention, have a dissociation constant less than $K_d = 10^{-3}$ are the following: acetic acid, citric acid, tartaric acid, metaboric acid and tetraboric acid, all are giving excellent results (Lengyel, Proszt, Szarvas: General and Inorganic Chemistry, Budapest, 1960, pp. 198–201). Very weak acids, as e.g. orthoboricacid, require a dwelling period of several days for yielding proper results.

The advantageous effect of the weak acids may be explained probably by the fact that said acids dissolve the carbonates and oxides, much more slowly than does the hydrochloric acid, accordingly, the carbonates and oxides penetrate far more deeply into the zones confining the filter. The slower dissolution is accompanied by a less vigorous gas formation, as a consequence, the danger of layer collapse is also less.

The weak acids having been used in the course of the process according to the invention do not destroy the material of the filter and the pipes, the mechanical properties of the glassfibre-reinforced synthetic pipes are not deteriorated either.

According to our experiences, the treatment having the character of an alkaline reaction, i.e. using the sodium hypochlorite and/or sodium bicarbonate solutions after the treatment with the acids highly increases the efficiency of the process according to the invention, in the majority of cases a productivity far excessing that of the original one could be achieved.

BEST MODE OF CARRYING OUT THE INVENTION

The process according to the invention will be explained in detail by way of examples.

EXAMPLE 1

The well having been started in 1938 with an initial water discharge of 180 l/min (MALEV well II), with no yield at the start of the process, was subjected to a traditional treatment for 48 hours by using a Mammothpump and a compressor. As a result of the treatment a water discharge of 120 l/minute could be obtained. Thereafter, through the pipe penetrating to the filter concentrated acetic acid in a quantity of 10 kg was introduced into the well; in the following operational phase, through the closed well-head, air pressure of 3 to 5 bar was produced for four hours by means of a compressor; after a pressure-free period lasting an hour, a pressure of 7 bar and of the duration of six hours was applied onto the well. After having scavenged the well with the pump for an hour, 100 liters of commercially available hypo-solution were introduced into the well; after a dwelling period of eight hours cleaning was performed by means of the scavenging pump. After a treatment with chemicals the water discharge of the well could be increased to 900 l/minute, amounting to the fivefold the original yield and to seven and half-fold of the value having been obtained by the traditional pumping process.

EXAMPLE 2

Into the well having been started in 1938, with an original water discharge of 1400 l/minute, the concentrated aqueous solution of 15 kg tartaric acid was introduced through the pipe penetrating to the filter. After a dwelling period of 24 hours and compressing, flushing by means of a scavenging pump was performed, thereafter the solution of sodium bicarbonate (5 kg sodium bicarbonate have been diluted with 40 liters water) was introduced into the filter zone. After a dwelling period of six hours scavenging was performed. After the chemical treatment the water discharge of the well amounted to 1750 l/minute, being 25% higher, than the original yield.

EXAMPLE 3

Into a 40 year old well of the depth of 300 m with no water discharge at all, into the filter zone the solution of citric acid (30 kg citric acid have been dissolved in 200 l water) introduced. After a dwelling period of 36 hours and compressing, flushing was performed by means of a scavenging pump and 100 liters commerically available hypo-solution were introduced into the well. After a dwelling period of eight hours, scavenging pumping was performed. As a consequence of the chemical treatment the water discharge amounted to 600 l/minute, equalling about double that of original yield.

EXAMPLE 4

Into a well of the depth of 150 m, having been drilled with mud and having a water discharge of 190 l/minute, following the traditional treatment, the solution of tetraboric acid (1 kg tetraboric acid has been dissolved in 20 l warm water) was introduced into the well. After a dwelling time of 48 hours and compressing, flushing by means of the scavenging pump was performed, thereafter 5 kg sodium bicarbonate having been dissolved in 40 l water were introduced into the filter zone. After two hours of compressing and the following cleaning with the scavenging pump the water discharge amounted to 280 l/minute, equalling to nearly one and a half of the water discharge having been measured prior to the chemical treatment.

We claim:

1. A process for increasing the water discharge of a drilled well, previously used for water delivery, and having decreased water discharge, which comprises the following steps:
   (a) introducing into a filter section of the well a weak acid whose dissociation constant is less than $K_D = 10^{-3}$ for a period of 10 to 48 hours under pressure;
   (b) flushing the filter section of the well by means of a scavenging pump to remove the weak acid;
   (c) introducing into the filter section a basic solution of sodium bicarbonate or sodium hypochlorite or mixtures thereof for a period of 1 to 36 hours; and
   (d) again, flushing the filter section of the well by means of a scavenging pump to remove the basic solution.

2. The process defined in claim 1, wherein in step (a) acetic acid is introduced as the weak acid.

3. The process defined in claim 1, wherein in step (a), tartaric acid is introduced as the weak acid.

4. The process defined in claim 1, wherein in step (a), citric acid is introduced as the weak acid.

5. The process defined in claim 1, wherein in step (a), metaboric acid, tetraboric acid or mixtures thereof are introduced as the weak acid.

* * * * *